United States Patent [19]
Jameson

[11] Patent Number: 4,984,951
[45] Date of Patent: Jan. 15, 1991

[54] MECHANICAL PREHENSOR

[75] Inventor: John W. Jameson, Harris County, Tex.

[73] Assignee: The Board of Trustees of the Leland Stanford Junior University, Stanford, Calif.

[21] Appl. No.: 412,540

[22] Filed: Sep. 22, 1989

Related U.S. Application Data

[63] Continuation of Ser. No. 146,049, Jan. 20, 1988, abandoned.

[51] Int. Cl.$^5$ ................................................. B25J 3/00
[52] U.S. Cl. ............................................. 414/1; 414/8; 901/8; 294/106
[58] Field of Search ................................. 414/5; 901/8

[56] References Cited

U.S. PATENT DOCUMENTS

| | | |
|---|---|---|
| 42,515 | 4/1864 | Spellerberg . |
| 50,014 | 9/1865 | Lindsay et al. . |
| 174,102 | 2/1876 | Adams . |
| 276,231 | 4/1883 | Doyle ................................. 294/25 |
| 345,846 | 7/1886 | Holmes . |
| 394,550 | 12/1888 | Ansley et al. . |
| 422,373 | 3/1890 | Caldwell . |
| 879,360 | 2/1908 | Broady . |
| 1,046,966 | 12/1912 | Carnes . |
| 1,362,156 | 12/1920 | Trautman . |
| 1,375,809 | 4/1921 | Armstrong . |
| 1,402,476 | 1/1922 | Carnes . |
| 1,409,513 | 3/1922 | Armstrong . |
| 1,422,468 | 7/1922 | Nicola . |
| 1,484,913 | 2/1924 | Surry . |
| 1,493,362 | 5/1924 | Martelli . |
| 1,774,715 | 9/1930 | Livingston . |
| 2,568,297 | 9/1951 | Philpott . |
| 2,568,298 | 9/1951 | Philpott . |
| 2,598,593 | 5/1952 | Parker . |
| 2,733,545 | 2/1956 | Guadagna . |
| 3,123,230 | 3/1964 | Oppenheimer et al. . |
| 3,146,015 | 8/1964 | Roberge . |
| 3,188,753 | 6/1965 | Lovercheck . |
| 3,267,830 | 6/1964 | Van Gaasbeek ................ 414/8 X |
| 3,535,711 | 10/1970 | Fick ................................. 414/5 X |
| 3,591,226 | 7/1971 | Elmore, Jr. . |
| 3,694,021 | 9/1972 | Mullen ............................ 414/4 X |
| 4,167,792 | 9/1979 | Carnegie . |
| 4,172,610 | 10/1979 | Johnson . |
| 4,208,830 | 6/1980 | Yoshida . |
| 4,302,138 | 11/1981 | Zarudiansky ................ 414/730 X |
| 4,315,650 | 2/1982 | Yoshida . |
| 4,466,649 | 8/1984 | Ozawa . |
| 4,575,297 | 3/1986 | Richter ........................... 414/7 X |
| 4,685,924 | 8/1987 | Massey ........................... 623/64 X |
| 4,685,929 | 8/1987 | Monesties ......................... 623/64 |
| 4,756,655 | 7/1988 | Jameson ............................. 414/2 |
| 4,834,443 | 5/1989 | Crowder et al. ................. 294/106 |

FOREIGN PATENT DOCUMENTS

| | | | |
|---|---|---|---|
| 869001 | 4/1971 | Canada ............................. 623/64 |
| 2031844 | 4/1980 | United Kingdom ............. 414/1 |

Primary Examiner—Frank E. Werner
Assistant Examiner—William M. Hienz
Attorney, Agent, or Firm—Flehr, Hohbach, Test, Albritton & Herbert

[57] ABSTRACT

A generally anthropomorphic prehensor having at least two mechanical finger apparatus which interface directly with an object being grasped by apparatus of mechanical linking and control mechanisms operatively connected to the operator's fingers. Each mechanical finger has at least two finger links adjacent one another, each finger link independently rotatable about parallel axes in a plane of movement in response to movements of the corresponding phalanges of the operator's fingers. The mechanical prehensor is particularly useful in hostile or hazardous environments.

4 Claims, 7 Drawing Sheets

MECHANICAL PREHENSOR

This invention was made as a result of work under NASA/Ames Research Center Contract NCC2-295. The government has certain rights in this invention.

This is a continuation, of application Ser. No. 146,049 filed Jan. 20, 1988 now abandoned.

TECHNICAL FIELD

The present invention relates to a generally anthropomorphic prehensor having at least two external finger means mechanically actuated by finger movements of an operator to grasp, hold, and manipulate objects. The mechanical prehensor is particularly useful in hostile or hazardous environments such as outer space, underwater, nuclear reactor sites or other hazardous environments, since the mechanical finger means are external to the operator's hand and may be constructed from suitable materials which are unreactive with the hostile environment, while the operator's hand and mechanical linking and control components may be sealed from the hazardous environment by means of a suitable protective shroud.

BACKGROUND ART

Manipulation means resembling crude pincers have been used in connection with diving suits for deep sea operations. The "Jim Suit", manufactured by UMEL of Farnborough, England, for example, has rudimentary external pincers for grasping which are mechanically actuated by hand movements, and it provides a gas-tight shroud around control mechanisms manipulable by the operator's hand. The pincers are claw-like, having two opposed finger means rotatable about a single axis in generally the same plane of movement. Mechanically actuated pincers of this type have some utility in grasping objects in hostile environments, but they achieve only a clamping-type grasp, and thus they provide limited external dexterity and manipulation.

Space suits developed for extra-vehicular activities in outer space typically have gloves for covering the hands of the space explorer. Due to pressurization inside the space suit and gloves, however, the gloves become very stiff during extra-vehicular activities, resulting in limited external dexterity and excessive hand fatigue.

Robotic manipulation devices having a plurality of finger means simulating human finger motions are currently being developed which may have some application in hostile environments. Robotic manipulation devices having multiple fingers capable of executing multiple degree of freedom movements are typically controlled electronically and require substantial amounts of energy for operation. While these types of robotic manipulation devices provide a high degree of external dexterity, the energy required for operation and the bulk of the control mechanisms render them impractical for use in many hostile environments.

It is an object of the present invention to provide a generally anthropomorphic prehensor having external finger means mechanically controllable by movements of the operator's fingers.

It is another object of the present invention to provide a generally anthropomorphic mechanical prehensor providing enhanced dexterity in hazardous environments which operates in response to movements of the operator's fingers and has no supplemental energy requirements.

It is another object of the present invention to provide a hand-powered mechanical prehensor which significantly reduces operator hand fatigue and increases operator safety and dexterity in hostile environments. It is yet another object of the present invention to provide a prehensor having at least two external mechanical finger means, each mechanical finger means capable of selectively executing multiple motions in a plane of motion, thus providing enhanced mechanical fingertip prehension and the ability to grasp and manipulate objects in a hostile environment. It is still another object of the present invention to provide a generally anthropomorphic prehensor having external finger means mechanically actuated by movements of the operator's fingers which provides smooth, accurate, sensitive mechanical finger control, and which is reliable and simple to operate.

DISCLOSURE OF THE INVENTION

The mechanical prehensor of the present invention comprises at least two generally anthropomorphic external mechanical finger means, each mechanical finger means having at least two finger links adjacent to one another and rotatable about parallel axes. Control link mechanisms are mechanically coupled to each of the mechanical finger links and the corresponding phalanges of the operator's fingers to provide movement of the finger links of the external mechanical fingers in response to movement of the corresponding phalanges of the operator's fingers. Each mechanical finger means is selectively and independently movable in a plane of movement with at least two degrees of freedom. At least two mechanical finger means are semi-opposed to one another and are actuated by the operator's thumb and at least one finger. According to a preferred embodiment, three mechanical fingers, including two finger means each having three adjacent finger links corresponding to the three phalanges of an operator's fingers, and a mechanical thumb having two adjacent finger links corresponding to the two phalanges of an operator's thumb and the requisite mechanical control components are mounted in a three-pronged support means. A gas-impermeable shroud may be mounted gas-tightly to the support means, with the mechanical fingers and thumb external to the shroud, and with the bulk of the finger control mechanisms and engagement means for engaging the operator's fingers mounted inside the protective shroud. The shroud and the support means may be mounted on a full body suit, such as a space suit, to provide the desired atmospheric and pressurized conditions for the operator's hand.

BRIEF DESCRIPTION OF THE DRAWINGS

Further features of the invention will be apparent from the following more detailed description of the invention read in conjunction with the following drawings, in which:

FIG. 5(a) shows a close up, side view of a portion of the mechanical figure of FIG. 5;

BEST MODE OF CARRYING OUT THE INVENTION

The mechanical prehensor of the present invention includes at least two mechanical finger means, with at least one mechanical finger means functioning as a finger capable of executing movements corresponding and in response to movements of an operator's finger, and one mechanical finger means functioning as a thumb semi-opposed to the finger and capable of executing movements corresponding and in response to movements of an operator's thumb. The drawings illustrate a preferred embodiment of the mechanical prehensor having three mechanical finger means, two functional fingers referred to herein as mechanical ring finger 30 and mechanical index finger 50 along with a functional thumb referred to herein as mechanical thumb 70, all arranged in a generally anthropomorphic configuration. The mechanical prehensor arrangement of the present invention is generally comprised of a plurality of shafts and pivots.

Figure 1:
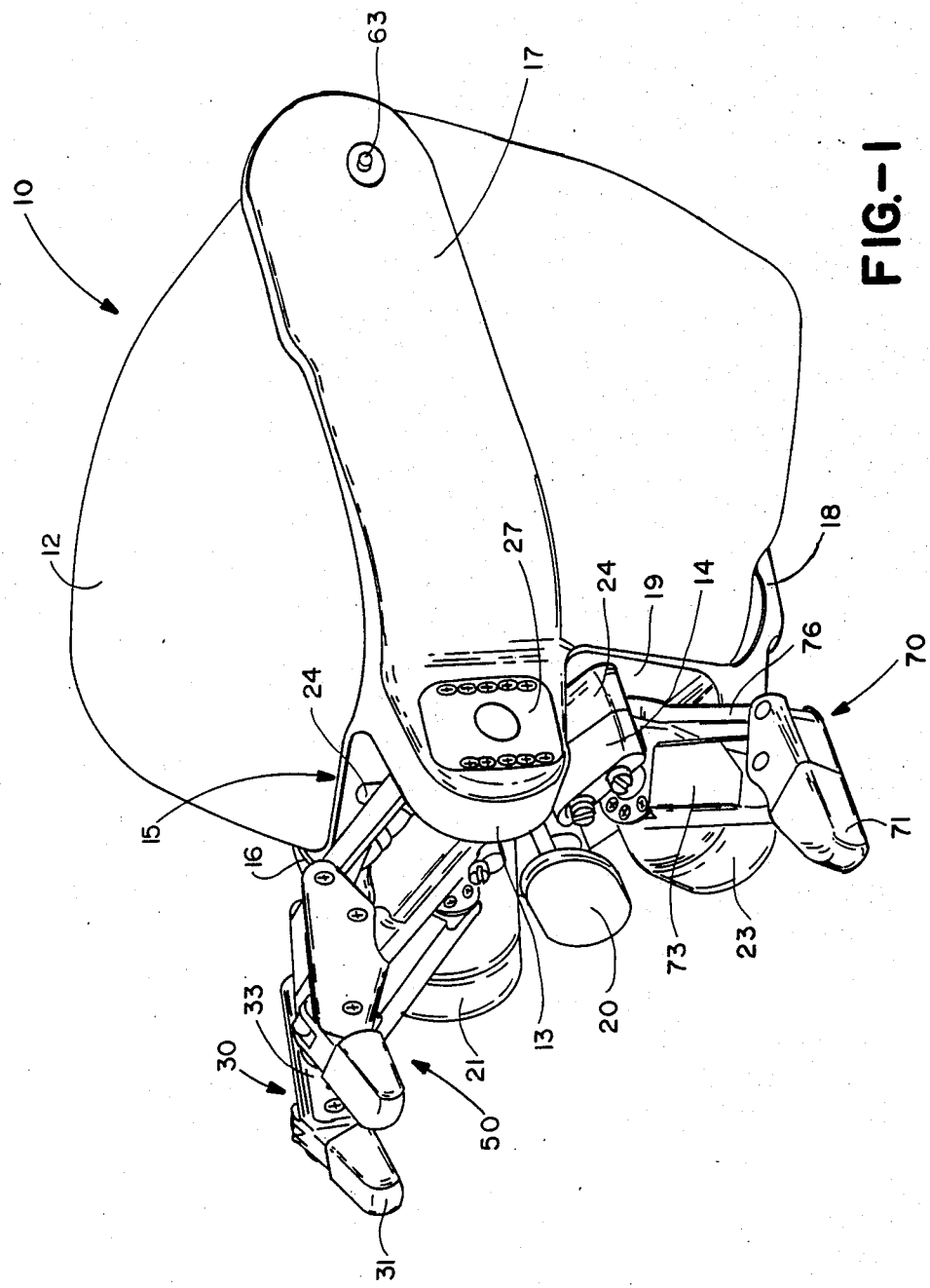
FIG. 1 shows a perspective view of the mechanical prehensor of the present invention with a protective shroud.

FIG. 1 shows mechanical prehensor 10 having mechanical ring finger 30, mechanical index finger 50 and mechanical thumb 70 mounted on three-pronged support means 15. Protective shroud 12 and three-pronged support means 15 enclose the mechanical control components for projecting the motion of an operator's fingers to mechanical fingers 30 and 50 and mechanical thumb 70, and engagement means for engaging the operator's fingers. Protective shroud 12 and three-pronged support means 15 preferably comprise a rigid, gas impermeable material, such as aluminum, molded fiberglass, or the like, and are gas-tightly sealed to one another by welding, bonding, or other means which are well known to the art. Alternatively, shroud 12 and support means 15 may be fabricated as a single, one piece unit. A substantially circular wrist interface unit may be mounted to the shroud and/or support means for attachment to protective shroud 12 and three-pronged support means 15 to facilitate gas-tight mounting of a mechanical prehensor 10 to a full body suit providing suitable atmospheric and pressurized conditions inside the pressurized enclosure provided by protective shroud 12 and support means 15.

Figure 2:
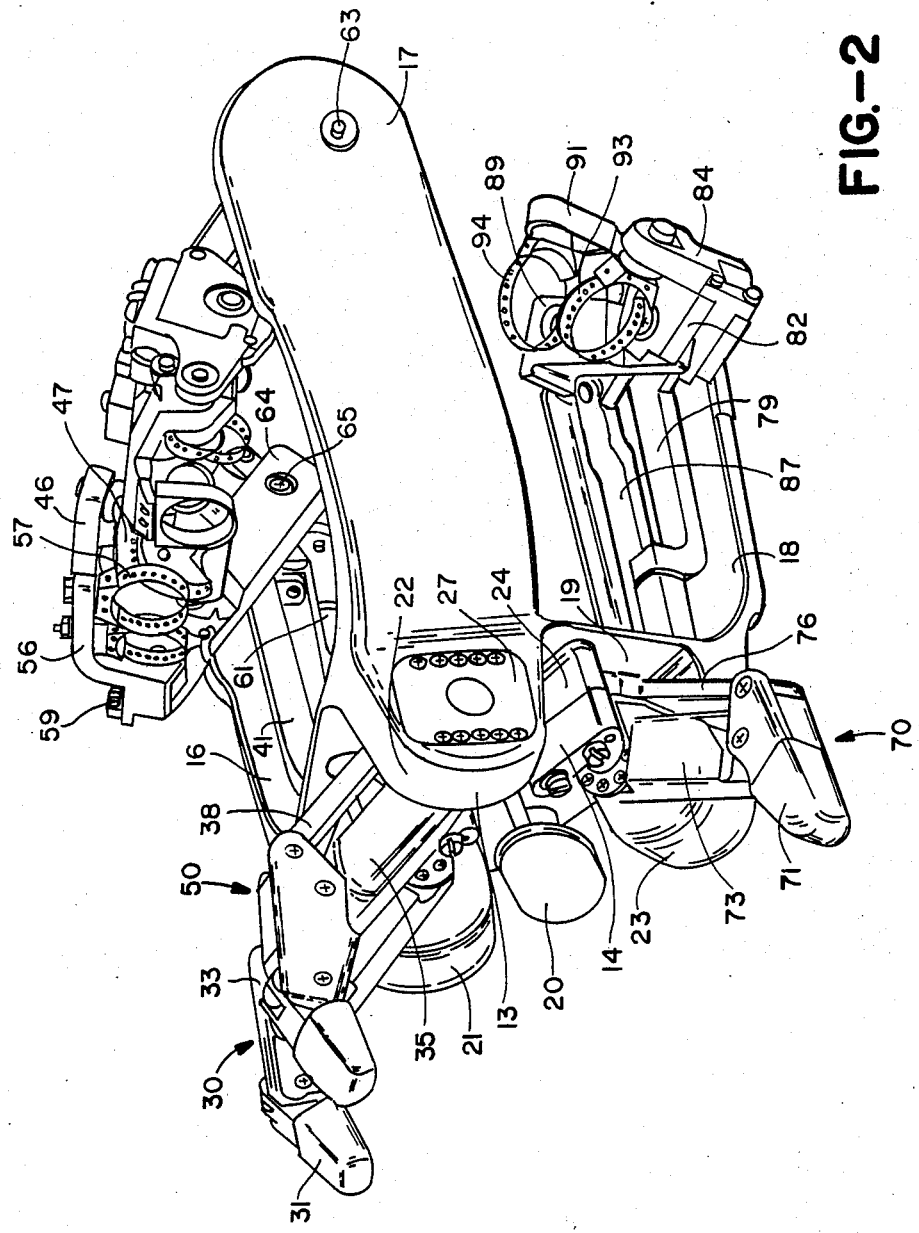
FIG. 2 shows a perspective view of the mechanical prehensor of the present invention with the protective shroud removed.

FIG. 2 illustrates mechanical prehensor 10 in greater detail with the protective shroud removed. Three-pronged support means 15 comprises ring finger support ear 16, index finger support ear 17, thumb support ear 18, and support palm 19 joining the finger and thumb support ears. At the interface of ring finger, index finger and thumb support ears 16, 17 and 18, respectively, with support palm 19, mechanical ring finger mounting means 21, mechanical index finger mounting means 22, and mechanical thumb mounting means 23, respectively, are provided to support the respective mechanical fingers. Additional support for the mechanical fingers and thumb is provided by mechanical finger shaft mount 13 and mechanical thumb shaft mount 14. Transfer of motion from inside the pressurized enclosure to the mechanical finger means will be described in detail below. According to a preferred embodiment of mechanical prehensor 10, palm assistor 20 is fastened to or formed as a unit with three-pronged support means 15 and projects from a generally central area of support palm 19 to assist in grasping and manipulating objects.

The structure and operation of mechanical ring finger 30 and its associated control components will be described in detail with reference to FIGS. 2-5. Mechanical ring finger 30 comprises distal finger link 31 hinged to medial finger link 33 along distal link joint 32, medial finger link 33 hinged to proximal finger link 35 along medial link joint 34, and proximal finger link 35 rotatable about proximal link joint axis 36. The axes of distal link joint 32 and medial link joint 34, and proximal link joint axis 36 are preferably substantially parallel, providing movement of mechanical ring finger 30 with at least two degrees of freedom in a single plane of motion. Finger links 31, 33 and 35 are arranged in a generally anthropomorphic configuration and are preferably proportioned to one another generally as the corresponding phalanges of a human finger are proportioned. The precise configuration of finger links 31, 33 and 35 and the manner of hinging the finger links to one another is unimportant as long as the structure of the finger links and their relation to one another is generally anthropomorphic.

Medial finger link 33 and proximal finger link 35 are selectively and independently rotatable about medial link joint 34 and proximal link joint axis 36, respectively, by rotation of medial control link 44 and proximal control link 64 about medial control joint 45 and proximal control joint 65, respectively. Medial phalange engagement means 46 is rigidly connected to medial control link 44 for engagement with the medial phalange of an operator's finger, and preferably the medial phalange of the middle and/or ring finger of the operator's hand. When the operator's finger is inserted into medial phalange engagement means 46, movement of the medial phalange of the operator's finger causes a corresponding movement of medial control link 44 and, by means of control components and mechanisms described in detail below, results in a corresponding movement of medial finger link 33 of mechanical ring finger 30. Medial extension member 37 is rigidly attached to medial control link 44, or may be formed as an extension of medial control link 44. Distal phalange engagement means 56 for engagement with the distal phalange of the middle and/or ring finger of the operator's hand is rigidly attached to distal control link 54, which is rotatably connected to medial extension member 37 at distal control joint 55. Distal control link 54 may be provided as a unitary extension of distal phalange engagement means 56.

Figure 3:
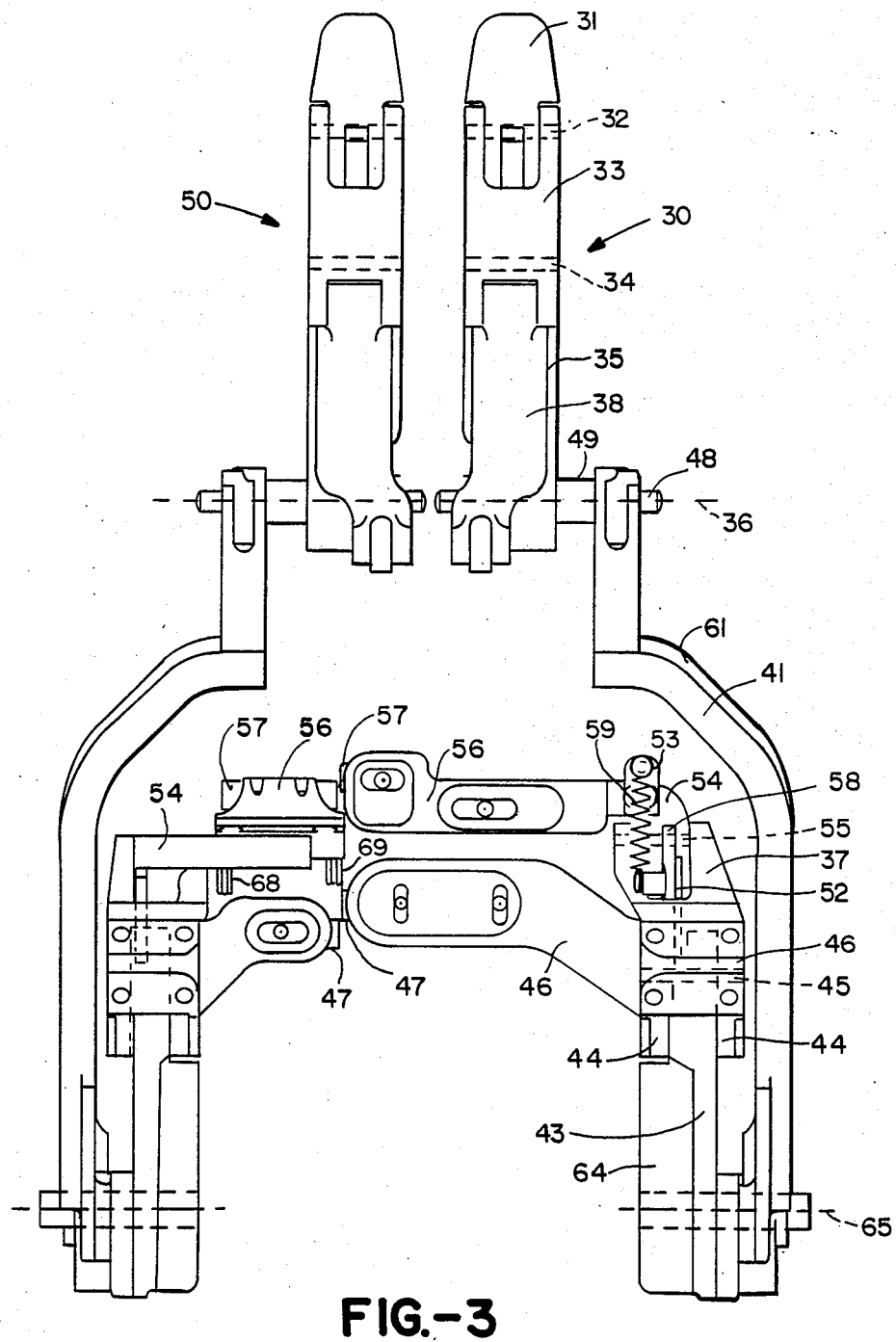
FIG. 3 shows a top plan view of two mechanical finger means operatively coupled to mechanical finger control components with the protective shroud and the support means removed.

According to a preferred embodiment of the present invention illustrated in FIGS. 2 and 3, medial phalange ring means 47 or the like, is adapted to engage the middle and ring fingers of the operator's hand in tandem, and is mounted to medial phalange engagement means 46. Engagement of two fingers of the operator's hand for control of mechanical ring finger 30 is not imperative, but greater operator comfort generally results from engagement of the medial phalanges of the operator's middle and ring fingers in tandem. Separated ring means or the like are preferably mounted on distal phalange engagement means 56 for engaging the distal phalanges of the operator's middle and ring fingers. Discrete means for engaging the distal phalanges of the operator's middle and ring fingers are preferred to provide finer mechanical fingertip control. Suitable adjustment mechanisms may be provided for lateral adjustment of the phalange engagement means and for tightening the phalange ring means to tailor the fit of mechanical prehensor 10 to an operator's hand.

Figure 4:
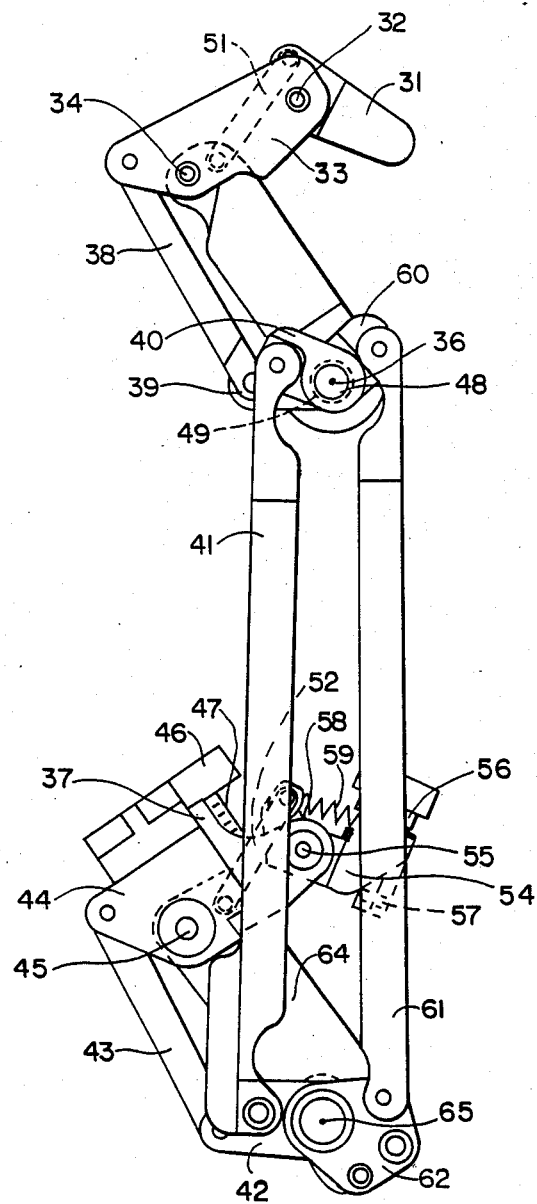
FIG. 4 shows a side view of a mechanical finger means in a flexed position operatively linked to mechanical finger control components.
Figure 5:
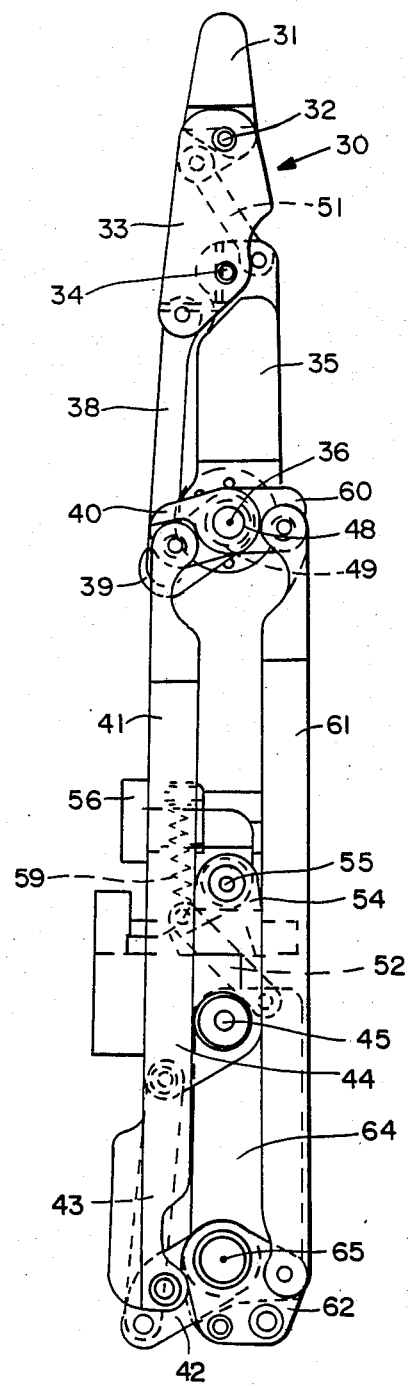
FIG. 5 shows a side view of the mechanical finger means of FIG. 4 in an extended position operatively linked to mechanical finger control components.

FIGS. 4 and 5 illustrate the mechanical control components governing movement of mechanical ring finger 30 in greater detail. FIG. 4 illustrates the finger 30 in a flexed position. FIG. 5 illustrates the finger 30 in an extended position. Rotation of distal finger link 31 about distal link joint 32 is coupled to rotation of medial finger link 33 about medial link joint 34 by distal link coupler bar 51 to provide the curling motion necessary for cylindrical and spherical grasps. Rotation of distal finger link 31 is thus controlled by movement of medial control link 44.

Distal control link 54 is rotatable about distal control joint 55 in one direction, preferably the clockwise direction with respect to the load override plate 58, and rotation in the opposite direction is inhibited by contact between portions of distal control link 54 and load override plate 58. Contact between distal control link 54 and load override plate 58 is maintained by load override spring 59, unless the torque exerted on distal control link 54 by the distal phalange of the operator's finger exceeds a threshold value.

Utilization of the load override assembly indirectly linking distal control coupler 52 and distal phalange engagement means 56 permits a more compact and lightweight construction of distal control link 54 and its supporting structure. Although motion of the distal and medial finger links are controllable by the medial control link, utilization of the distal control link provides more accurate mechanical fingertip control. Large forces may still be exerted on the distal finger link, even though the distal control link overrides, by exerting large forces through the medial control link. This arrangement is preferred for many applications, since large forces generally are not used for fine mechanical fingertip control.

Medial control link 44 is rotatable about medial control joint 45 and is linked to medial control link crank 42 by means of medial control coupler 43. Medial control link crank 42 is freely rotatable about proximal control joint 65 and is rotatably mounted to a first end of medial control pushrod 41. A second opposite end of medial control pushrod 41 is rotatably mounted to medial control crank 40. Medial control crank 40 is rigidly mounted on inner shaft 48 whose axis is coincident with proximal link joint axis 36. Rotation of inner shaft 48 causes movement of medial link crank 39 mounted thereon. Medial link crank 39 is in turn rotatably mounted to medial link coupler bar 38, which is rotatably retained on medial finger link 33. Rotation of the medial phalanges of the operator's middle and/or ring fingers causing rotation of medial control link 44 about medial control joint 45 is thus ultimately translated to rotational movement of medial finger link 33 about medial link joint 34 by means of the mechanical linkages and control components described above. The configuration and, to some extent, the arrangement of mechanical control components may be modified while providing similar functional operation. One of the advantages of the mechanical prehensor of the present invention is that it employs only mechanical linkages and does not require cables or gears in the control mechanism.

The control mechanisms providing movement of proximal finger link 35 are similar to those described above with reference to medial finger link 33. Proximal control link 64 is rotatable about proximal control joint 65. Proximal control link 64 is rigidly mounted to proximal control link crank 62 which is rotatably mounted to a first end of proximal control pushrod 61. An opposite end of proximal control pushrod 61 is rotatably connected to proximal control crank 60, which is rigidly mounted on outer shaft 49. The central axis of outer shaft 49 is coincident with proximal link joint axis 36. Rotation of outer shaft 49 produces rotation of proximal finger link 35 about proximal link joint axis 36. Rotation of the proximal phalanges of the operator's middle and-/or ring fingers causing rotation of proximal control link 64 about proximal control joint 65 is thus ultimately translated to rotational movement of proximal finger link 35 about proximal link joint axis 36.

Mechanical index finger 50 and its associated control components may be provided in substantially the same manner, using a mirror image arrangement, as described above with reference to mechanical ring finger 30. Distal, medial and proximal phalange engagement means are preferably adapted to engage a single operator finger, the index finger, rather than multiple fingers. The control components and operation of mechanical index finger 50 may be identical to the control components and operation of mechanical ring finger 30, and control components of mechanical index finger 50 which are substantially similar to the corresponding control components described above with reference to mechanical ring finger 30 are numbered accordingly. FIG. 3 illustrates a modified configuration of the distal control link mechanism for mechanical index finger 50, however, wherein distal control link 54 is jointed directly to distal control coupler 52, rather than indirectly by means of load override plate 58, as described above with reference to mechanical ring finger 30. Distal phalange engagement means 56 is rigidly affixed to the ends of two torsion springs 68 and 69, and the opposite ends of torsion springs 68 and 69 are rigidly affixed to distal control link 54. A finger ring means 57 is provided which performs the same function as finger ring means 47, described above, except it functions with respect to the distal phalange as opposed to the medial phalange. Rotation of index distal control link 54 about an axis substantially aligned with index distal control joint 55 is allowed in a first, preferably clockwise direction only when the force exerted on distal phalange engagement means 56 exceeds a threshold value corresponding to the stiffness of the torsion springs. Rotation of index distal control link 54 is thereby permitted to relieve the distal link and its supporting structures from excessive stresses.

According to a preferred embodiment of the mechanical prehensor of the present invention utilizing the mechanical finger control components and linkages described above, mechanical ring finger 30 and mechanical index finger 50 are each movable with two degrees of freedom, represented by selective and independent movement of the proximal and medial finger links in a single plane of movement. It is preferred, for most applications, that the planes of movement of mechanical ring finger 30 and mechanical index finger 50 are oriented at an angle of about 5 degrees to about 25 degrees to one another, and most preferably at an angle of about 15 degrees to one another. This orientation of the mechanical index and ring fingers is generally anthropomorphic, and it provides increased mechanical fingertip prehension at the respective distal finger links. To provide increased mechanical finger dexterity and ability to manipulate objects, it is preferred that the tips of the distal finger links of the mechanical index and ring fingers nearly touch when the operator's fingers (and thereby the mechanical fingers) are in a substantially curled position.

To provide increased operator comfort, it is preferred that proximal control joint 65, medial control joint 45 and distal control joint 55 are aligned as closely as possible with the corresponding interphalangeal joints of the operator's fingers. Proximal control links 64, medial control links 44 and distal control links 54 for mechanical ring finger 30 and mechanical index finger 50 may be provided in parallel planes rather than in angled planes of motion as mechanical finger links of the mechanical index and ring fingers are oriented. This arrangement results in slight discomfort when the operator's fingers are closed in a fist, but it provides a compact and convenient arrangement of the control components.

Mechanical thumb 70 and its associated control components are also arranged and operate similarly to the corresponding components previously described with reference to mechanical ring finger 30. Mechanical thumb 70 and its associated control mechanisms differ from the mechanical fingers in that the mechanical thumb has only two thumb links, and only two control links are provided corresponding to the two phalanges of the operator's thumb. Mechanical thumb 70 and its control mechanisms operate similarly to the proximal and medial links of mechanical ring finger 30.

Figure 6:
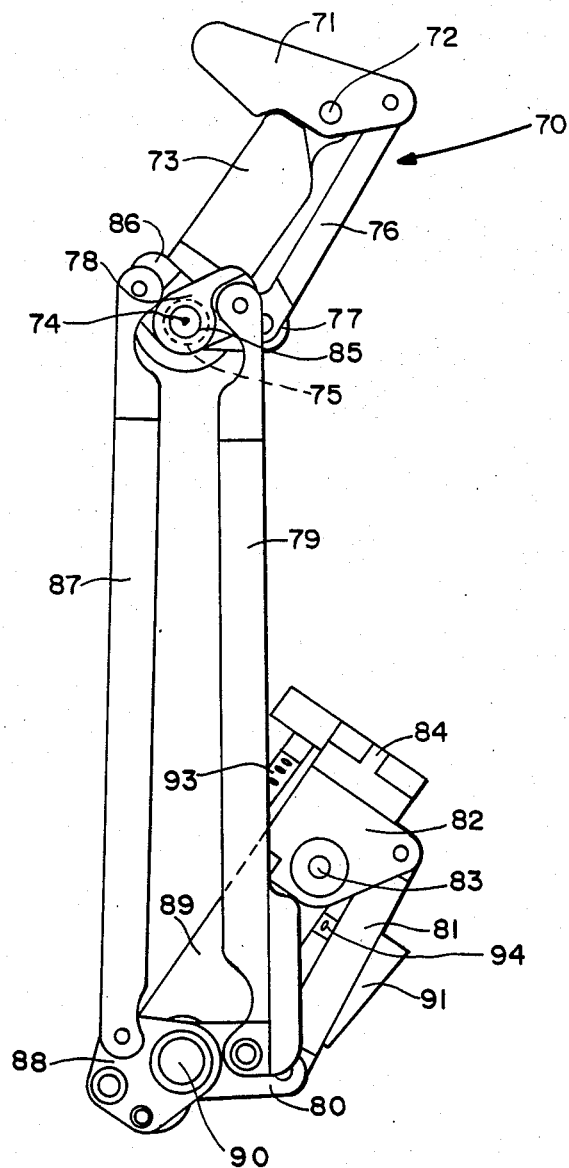
FIG. 6 shows a side view of a mechanical thumb means in a flexed position operatively linked to mechanical thumb control components.

As shown in FIG. 6, mechanical thumb 70 comprises distal thumb link 71 hinged to proximal thumb link 73 along distal link joint 72 and proximal thumb link 73 rotatable about proximal link joint axis 74. The axis of distal link joint 72 and proximal link joint axis 74 are parallel to provide independent and selective movement of the distal and proximal thumb links in a single plane of movement. The precise configuration of thumb links 71 and 73 and the manner of hinging the thumb links to one another is not important as long as the structure of the thumb links and their relation to one another is generally anthropomorphic.

Distal thumb link 71 and proximal thumb link 73 are selectively and independently rotatable about distal link joint 72 and proximal link joint axis 74, respectively, by rotation of distal control link 82 and proximal control link 89 about distal control joint 83 and proximal control joint 90, respectively. Distal phalange engagement means 84 is rigidly connected to distal control link 82 for engagement, by phalange ring means 93 or the like, of the distal phalange of the operator's thumb. Movement of the distal phalange of the operator's thumb causes a corresponding movement of distal control link 82 and, by means of control mechanisms described in greater detail below, results in a corresponding movement of distal thumb link 71. Likewise, proximal control link 89 is rigidly attached to proximal phalange engagement means 91 for engagement, by phalange ring means 94 or the like, of the proximal phalange of the operator's thumb.

FIG. 6 illustrates the mechanical control components of mechanical thumb 70 in detail. Distal control link 82 is rotatable about distal control joint 83 and is linked to distal control link crank 80 by means of distal control coupler 81. Distal control link crank 80 is rotatably mounted to a first end of distal control pushrod 79, while a second end of distal control pushrod 79 is rotatably connected to distal control crank 78. Distal control crank 78 is rigidly mounted on inner shaft 85 whose axis is coincident with proximal link joint axis 74. Rotation of inner shaft 85 causes movement of distal link crank 77 mounted thereon. Distal link crank 77 is in turn mounted to distal link coupler bar 76, which is rotatably mounted to distal thumb link 71. Rotation of the distal phalange of the operator's thumb causing rotation of distal control link 82 about distal control joint 83 is thus ultimately translated to rotational movement of distal thumb link 71 about distal link joint 72 by means of mechanical linkages and control components.

In a similar fashion, proximal control link 89 is rotatable about proximal control joint 90. Proximal control link 89 is rigidly attached to proximal control link crank 88, which is rotatably mounted to a first end of proximal control pushrod 87. A second, opposite end of proximal control pushrod 87 is rotatably connected to proximal control crank 86, which is rigidly mounted on outer shaft 75 aligned with proximal link joint axis 74. Proximal thumb link 73 is thereby rotatable about proximal link joint axis 74. Rotation of the proximal phalange of the operator's thumb causing rotation of proximal control link 89 about proximal control joint 90 is thus ultimately translated to rotational movement of proximal thumb link 73 about proximal link joint axis 74.

To provide increased operator comfort, it is preferred that proximal control joint 90 and distal control joint 83 are aligned as closely as possible with the corresponding interphalangeal joints of the operator's thumb.

Mechanical thumb 70 is arranged generally anthropomorphically with respect to mechanical ring finger 30 and mechanical index finger 50. It is preferred, for most applications, that the plane of movement of mechanical thumb 70 is oriented at an angle of about 45 degrees to about 65 degrees, and most preferably at an angle of about 55 degrees to an average plane of motion of the mechanical fingers. If a single mechanical finger means is provided, the plane of movement of the links of that mechanical finger would represent the average plane of motion. The average plane of motion of the mechanical index and ring fingers described above is a plane bisecting the index and ring finger planes of motion. This orientation of the mechanical thumb is generally anthropomorphic and provides increased dexterity, operator comfort, and ability to manipulate objects.

According to a preferred embodiment of the mechanical prehensor of the present invention, the ratio of motion of the mechanical finger links to the corresponding control links is about 1.0 to about 1.10. This ratio of motion permits the mechanical fingers to reach useful positions which would otherwise result in collisions between control components of the control linkages. The mechanical fingers and thumb are preferably mounted to the appropriate mounting means of three-pronged support means 15 at the inner and outer shafts along their respective proximal link joint axes. The mechanical finger and thumb control linkages are preferably mounted to the appropriate support ear of three-pronged support means 15 at their respective proximal control joint axes by fastening means 63, as shown in FIG. 2. A mounting plate may be detachably fastened to each support ear of the three-pronged support means at the proximal control joint axis by fastening means 63 to facilitate assembly.

Figure 7:
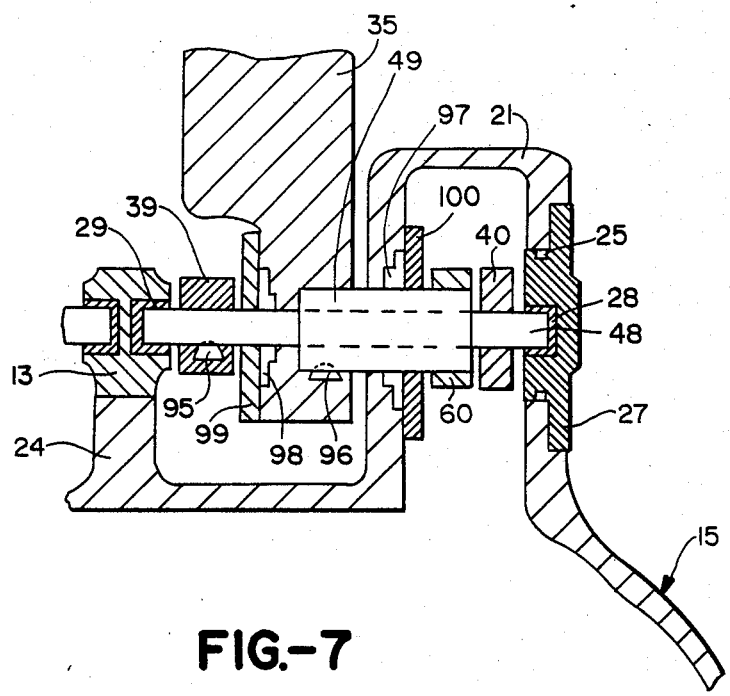
FIG. 7 shows an enlarged cross-sectional view of the attachment of a mechanical finger means to the support means.

FIG. 7 illustrates the attachment of mechanical ring finger 30 to three-pronged support means 15. Mechanical index finger 50 and mechanical thumb 70 are preferably mounted to the support means in a similar fashion. Inner shaft 48 is supported at one end and is freely rotatable in bushing 28. Bushing 28 is in turn mounted in crank cover plate 27 which is rigidly fixed to mechanical ring finger mounting means 21. Crank cover plate 27 is removable from mechanical ring finger mounting means 21 for assembly purposes, and sealing element 25, such as an O-ring, provides a gas-tight seal between crank cover plate 27 and mounting means 21. Inner shaft 48 is supported at the opposite end and is freely rotatable in bushing 29. Bushing 29 is in turn mounted in mechanical finger shaft mount 13, which is rigidly connected to mounting stud 24 projecting from support palm 19.

Medial control crank 40 is rigidly mounted on inner shaft 48, such as by welding, and is rotatably mounted with respect to medial link crank 39 by means of Woodruff key 95. Inner teflon rotary seal 97 provides a gas-tight seal around outer shaft 49 and is retained by outer seal plate 100. Proximal control crank 60 is rigidly mounted on outer shaft 49, such as by welding, and is rotatably mounted with respect to proximal finger link 35 by means of Woodruff key 96. Outer teflon rotary seal 98 provides a gas-tight seal around inner shaft 48 and is retained by inner seal plate 99. Other types of sealing elements which are known to the art, such as O-rings, may be substituted for teflon rotary seals.

Inner shaft 48 of mechanical index finger 50 is preferably mounted between mechanical finger shaft mount 13 and the crank cover plate mounted on mechanical index finger mounting means 22 in the same manner as described above with reference to mechanical ring finger 30. Mechanical thumb 70 is similarly mounted between mechanical thumb shaft mount 14 and mechanical thumb mounting means 23 of three-pronged support means 15.

The mechanical fingers and their associated control components are preferably fabricated from rigid, lightweight materials such as aluminum, molded composites, or the like. As is known to the art, cavities may be drilled in the components to reduce the weight of the mechanical prehensor assembly. The external components such as the mechanical fingers, are preferably fabricated from a material which is unreactive to environmental conditions in the hostile or hazardous environment in which use is intended. The three-pronged support means is also fabricated from a rigid, lightweight material which is unreactive under environmental conditions.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

What is claimed is:

1. A generally anthropomorphic prehensor mechanically actuated by movements of an operator's fingers comprising:

a first mechanical finger means consisting primarily of a plurality of shaft members and pivots having at least two finger links adjacent one another and rotatable about parallel axes permitting said first mechanical finger means to move with at least two degrees of freedom in a first plane of movement, and a second mechanical finger means having at least two mechanical finger links adjacent one another and rotatable about parallel axes permitting said second mechanical finger means to move with at least two degrees of freedom in a second plane of movement;

first and second mechanical finger control mechanisms coupled to said first and second mechanical finger means and specifically configured for engagement by a first and second finger of an operator, respectively, for directly projecting movements of the operator's fingers to said mechanical finger means through said plurality of shaft members and pivots, each of said mechanical finger control mechanisms comprising at least two control links corresponding to phalanges of an operator's finger, and adapted to move in response to movement of the corresponding phalanges of an operator's finger;

said prehensor further comprising a support means; first and second mounting means connected to said support means; first and second support ears; and a support palm joining said first and second support ears, said first and second mechanical finger means being mounted to said first and second mounting means, respectively, and said first and second mechanical finger control mechanisms being mounted to said first and second support ears, respectively.

2. A generally anthropomorphic prehensor mechanically actuated by movements of an operator's fingers according to claim 1, additionally comprising a gas-impermeable shroud affixed in a gas-tight manner to said support means with said mechanical finger means external to said shroud and said mechanical finger control mechanisms within said shroud.

3. A generally anthropomorphic prehensor mechanically actuated by movements of an operator's fingers according to claim 1, wherein said support palm of said support means has a palm assistor projecting therefrom to assist said mechanical finger means in grasping and manipulating objects.

4. A generally anthropomorphic prehensor mechanically actuated by movements of an operator's fingers comprising:

a first mechanical finger means having at least two finger links adjacent one another and rotatable about parallel axes permitting said first mechanical finger means to move with at least two degrees of freedom in a first plane of movement, and a second mechanical finger means having at least two finger links adjacent one another and rotatable about parallel axes permitting said second mechanical finger means to move with at least two degrees of freedom in a second plane of movement;

first and second mechanical finger control mechanisms coupled to said first and second mechanical finger means and specifically configured for engagement by a first and second finger of an operator, respectively, for directly projecting movements of an operator's fingers to said mechanical finger means, each of said mechanical finger control mechanism comprising at least two control links corresponding to phalanges of an operator's finger, and adapted to move in response to movements of the corresponding phalanges of the operator's finger;

said generally anthropomorphic prehensor further includes a support means; first and second mounting means connected to said support means; first and second support ears; and a support palm joining said first and second support ears, said first and second mechanical finger means being mounted to said first and second mounting means, respectively, and said first and second mechanical finger control mechanisms being mounted to said first and second support ears, respectively; and a gas-impermeable shroud affixed in a gas-tight manner to said support means with said mechanical fingers external to said shroud and said mechanical finger control mechanisms within said shroud.

* * * * *